(12) United States Patent
Choi et al.

(10) Patent No.: US 11,505,158 B2
(45) Date of Patent: Nov. 22, 2022

(54) VEHICLE CENTER AIRBAG

(71) Applicants: Hyundai Motor Company, Seoul (KR); Kia Motors Corporation, Seoul (KR)

(72) Inventors: Jae Ho Choi, Seoul (KR); Yoon Suk Lim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 137 days.

(21) Appl. No.: 17/075,448

(22) Filed: Oct. 20, 2020

(65) Prior Publication Data

US 2021/0268987 A1 Sep. 2, 2021

(30) Foreign Application Priority Data

Feb. 28, 2020 (KR) ........................ 10-2020-0025587

(51) Int. Cl.
| | | |
|---|---|---|
| *B60R 21/233* | (2006.01) | |
| *B60R 21/207* | (2006.01) | |
| *B60R 21/231* | (2011.01) | |
| *B60R 21/2338* | (2011.01) | |

(52) U.S. Cl.
CPC .......... *B60R 21/233* (2013.01); *B60R 21/207* (2013.01); *B60R 21/2338* (2013.01); *B60R 21/23138* (2013.01); *B60R 2021/23146* (2013.01); *B60R 2021/23161* (2013.01);
(Continued)

(58) Field of Classification Search
CPC ................ B60R 21/233; B60R 21/207; B60R 21/23138; B60R 21/2338; B60R 2021/23146; B60R 2021/23161; B60R 2021/23308; B60R 2021/23386;
(Continued)

(56) References Cited

U.S. PATENT DOCUMENTS

| | | | | |
|---|---|---|---|---|
| 5,730,464 A | * | 3/1998 | Hill ................... | B60R 21/23138 |
| | | | | 280/730.2 |
| 7,360,790 B2 | * | 4/2008 | Hasebe ............... | B60R 21/2338 |
| | | | | 280/743.2 |

(Continued)

FOREIGN PATENT DOCUMENTS

| | | |
|---|---|---|
| JP | 11-510765 A | 9/1999 |
| JP | 2012-192872 A | 10/2012 |

(Continued)

OTHER PUBLICATIONS

Choi et al. KR 2011-0047559, Car Air Bag, Machine English Translation, ip.com (Year: 2011).*

*Primary Examiner* — Karen Beck
(74) *Attorney, Agent, or Firm* — Morgan, Lewis & Bockius LLP (57) ABSTRACT

A vehicle center airbag may include a main cushion and a plurality of sub-cushions. The main cushion is mounted on a lateral surface of a seat back and is deployed in a forward direction, being positioned beside a passenger when a side collision occurs. The sub-cushions are configured to communicate with the main cushion and are deployed upwards from the top portion of the main cushion. When the sub-cushions are deployed, they extend in a forward-backward direction of the vehicle and are positioned above the torso of the passenger.

9 Claims, 10 Drawing Sheets

(52) U.S. Cl.
CPC ............... *B60R 2021/23308* (2013.01); *B60R 2021/23386* (2013.01)

(58) Field of Classification Search
CPC .... B60R 2021/0006; B60R 2021/0048; B60R 2021/0058
See application file for complete search history.

(56) References Cited

U.S. PATENT DOCUMENTS

| | | | | |
|---|---|---|---|---|
| 9,016,718 B2* | 4/2015 | Fukawatase | ........... | B60R 21/233 |
| | | | | 280/730.2 |
| 10,065,594 B2* | 9/2018 | Fukawatase | ........... | B60R 21/233 |
| 10,493,940 B2* | 12/2019 | Sugishima | ............ | B60R 21/233 |
| 10,543,800 B2* | 1/2020 | Kwon | ................... | B60R 21/207 |
| 10,543,801 B2* | 1/2020 | Kwon | ................... | B60R 21/233 |
| 10,899,305 B2* | 1/2021 | Gwon | ................ | B60R 21/2338 |
| 10,926,735 B2* | 2/2021 | Deng | ................... | B60R 21/231 |
| 10,988,102 B2* | 4/2021 | Stegmeier | ............. | B60R 21/233 |
| 11,292,419 B2* | 4/2022 | Wiik | ................ | B60R 21/23138 |
| 2003/0218325 A1* | 11/2003 | Hasebe | .............. | B60R 21/2338 |
| | | | | 280/743.2 |
| 2007/0096444 A1* | 5/2007 | Bostrom | ........... | B60R 21/23138 |
| | | | | 280/730.2 |
| 2009/0001695 A1* | 1/2009 | Suzuki | .................. | B60R 21/231 |
| | | | | 280/730.2 |
| 2011/0309603 A1* | 12/2011 | Choi | ..................... | B60R 21/231 |
| | | | | 280/729 |
| 2012/0119475 A1* | 5/2012 | Choi | ................. | B60R 21/23138 |
| | | | | 280/729 |
| 2016/0167616 A1* | 6/2016 | Wiik | ................ | B60R 21/23138 |
| | | | | 280/729 |
| 2016/0229369 A1* | 8/2016 | Thomas | ............ | B60R 21/23138 |
| 2017/0158158 A1* | 6/2017 | Thomas | ................ | B60R 21/233 |
| 2017/0334386 A1* | 11/2017 | Park | ..................... | B60R 21/2171 |
| 2019/0217807 A1 | 7/2019 | Kobayashi | | |
| 2020/0062212 A1* | 2/2020 | Markusic | .......... | B60R 21/23138 |
| 2020/0130629 A1* | 4/2020 | Fuma | ................ | B60R 21/23138 |
| 2020/0180546 A1* | 6/2020 | Komura | ............ | B60R 21/23138 |
| 2021/0101552 A1* | 4/2021 | Kim | ...................... | B60R 21/264 |
| 2021/0170978 A1* | 6/2021 | Acker | ................... | B60R 21/233 |

FOREIGN PATENT DOCUMENTS

| | | | |
|---|---|---|---|
| JP | 2013-166535 A | | 8/2013 |
| KR | 20110047559 A | * | 5/2011 |
| KR | 10-2013-0065119 A | | 6/2013 |
| KR | 20170021964 A | * | 3/2017 |
| KR | 20200047407 A | * | 5/2020 |
| KR | 20200055466 A | * | 5/2020 |
| KR | 20210144377 A | * | 11/2021 |

* cited by examiner

VEHICLE CENTER AIRBAG

CROSS REFERENCE TO RELATED APPLICATION

The present application claims priority to Korean Patent Application No. 10-2020-0025587, filed Feb. 28, 2020, the entire contents of which is incorporated herein for all purposes by this reference.

BACKGROUND OF THE INVENTION

Field of the Invention

The present invention relates to a vehicle center airbag.

Description of Related Art

Generally, when a vehicle side collision occurs, side impact sensors (SIS) which are positioned on vehicle doors and other sensors detect a side impact which triggers side airbags mounted on a lateral surface of a seat back to be deployed between a door and a passenger, protecting the pelvic and lower abdomen regions of the passenger.

When a side collision occurs, a passenger in the vehicle is injured not only due to the side collision of the vehicle but also due to a collision with an internal component or with another passenger.

Accordingly, both of the lateral surfaces of each seat back, which respectively surface toward a door and a center armrest, are provided with an external side airbag and a central side airbag (also called center airbag), respectively.

A center airbag in the related art is designed to be deployed forward from a lateral surface of a seat back to protect the flank of a passenger when a side collision occurs. However, in practice, when a side collision occurs, the center airbag in the related art is moved in a direction opposite to the collision spot due to the inertia. Thus, the passenger may collide with an internal component mounted inside the vehicle or with another passenger.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle center airbag including a main cushion and a sub-cushion that are mounted on a lateral surface of a seat back, which is nearer a center armrest than a door. In the vehicle center airbag, the sub-cushion inflates upwards from the top portion of the main cushion, and the sub-cushion is supported on a lateral surface of an adjacent seat, supporting the main cushion.

According to various aspects of the present invention, there is provided a vehicle center airbag including: a main cushion mounted on an inner lateral surface of a seat back of a seat and configured to be deployed forward when a collision occurs, being positioned beside a passenger sitting in the seat when deployed; and a plurality of sub-cushions configured to communicate with the main cushion and to be deployed upwards from a top portion of the main cushion, the sub-cushions being elongated in a backward-forward direction of a vehicle and being positioned above the torso of the passenger when deployed.

In the vehicle center airbag, the main cushion may be deployed between the lateral surface of the seat and a center console.

In the vehicle center airbag, the sub-cushions may include: a first sub-cushion to be deployed in a direction opposite to the passenger sitting in the seat from the top portion of the main cushion; and a second sub-cushion to be deployed toward the passenger sitting in the seat from the top portion of the main cushion. The first sub-cushion, when deployed, may extend in the backward-forward direction so that a front portion thereof may support a lateral surface of the second sub-cushion and a rear portion thereof may be supported on a lateral surface of an adjacent seat. The second sub-cushion, when deployed, may be positioned at a region corresponding to a lateral portion of the head and shoulder of the passenger.

The vehicle center airbag may further include a first tether having a first end portion coupled to the first sub-cushion and a second end portion coupled to the second sub-cushion, the first tether providing tight contact between the first sub-cushion and the second sub-cushion.

In the vehicle center airbag, the sub-cushions may further include a third sub-cushion configured to be deployed between the first sub-cushion and the second sub-cushion, supporting the first sub-cushion and the second sub-cushion at both sides thereof.

The vehicle center airbag may further include a second tether having a first end portion coupled to the first sub-cushion and a second end portion coupled to the second sub-cushion, the second tether providing tight contact among the first sub-cushion, the second sub-cushion, and the third sub-cushion.

In the vehicle center airbag, the sub-cushions may include: a fourth sub-cushion configured to be deployed in a direction opposite to the passenger sitting in the seat from the top portion of the main cushion; and a fifth sub-cushion configured to be deployed toward the passenger from a top portion of the fourth sub-cushion. The fourth sub-cushion may extend in the backward and forward direction thereof. A bottom portion of a front portion of the fourth sub-cushion may be connected to the top portion of the main cushion, and a rear portion of the fourth sub-cushion may be supported on a lateral surface of an adjacent seat in the same row. The fourth sub-cushion and the fifth sub-cushion are positioned in a region corresponding to a lateral portion of the head and shoulder of the passenger when deployed.

The vehicle center airbag may further include a third tether having a first end portion coupled to the fourth sub-cushion and a second end portion coupled to the fifth sub-cushion, the third tether providing tight contact between the fourth sub-cushion and fifth sub-cushion.

The vehicle center airbag may further include a fourth tether having a first end portion coupled to the fifth sub-cushion and a second end portion coupled to the seat back, the fourth tether supporting the fourth sub-cushion, the fifth sub-cushion, and the main cushion to be positioned beside the passenger.

In the vehicle center airbag, the sub-cushions may include: a sixth sub-cushion configured to be deployed upwards from the top portion of the main cushion; and a seventh sub-cushion configured to communicate with the sixth sub-cushion and to be deployed in a direction opposite to the passenger from the sixth sub-cushion. The sixth sub-cushion may be positioned in a region corresponding to a lateral portion of the head and shoulder of the passenger.

The seventh sub-cushion may extend in the backward and forward direction so that a front portion thereof may support the sixth sub-cushion and a rear portion thereof may be supported on a lateral surface of an adjacent seat in the same row.

The vehicle center airbag may further include a fifth tether having a first end portion coupled to the sixth sub-cushion and a second end portion coupled to the seventh sub-cushion, the fifth tether providing tight contact between the sixth sub-cushion and the seventh sub-cushion.

According to various exemplary embodiments of the present invention, when a vehicle side collision occurs, the main cushion of the center airbag mounted on the center-side lateral surface of a seat back can protect a lateral portion of the passenger.

The sub-cushion deployed upwards from the top portion of the main cushion extends in the backward-forward direction of the vehicle. The front portion of the sub-cushion is connected to the main cushion in a manner to support the main cushion. The rear portion of the sub-cushion is supported on a lateral surface of an adjacent seat in the same row. Thus, the sub-cushion can support the main cushion and protects the lateral portion of the head and shoulder of the passenger.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural and functional descriptions of embodiments of the present invention included herein are only for illustrative purposes of the exemplary embodiments of the present invention. The present invention may be embodied in various forms without departing from the spirit and significant characteristics of the present invention. Therefore, the exemplary embodiments of the present invention are included only for illustrative purposes and may not be construed as limiting the present invention.

Reference will now be made in detail to various embodiments of the present invention, specific examples of which are illustrated in the accompanying drawings and described below, since the exemplary embodiments of the present invention may be variously modified in various forms. While the present invention will be described in conjunction with exemplary embodiments thereof, it is to be understood that the present description is not intended to limit the present invention to those exemplary embodiments. On the other hand, the present invention is directed to cover not only the exemplary embodiments of the present invention, but also various alternatives, modifications, equivalents and other embodiments which may be included within the spirit and scope of the present invention as defined by the appended claims.

It will be understood that, although the terms "first", "second", etc. may be used herein to describe various elements, these elements may not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element or intervening elements may be present therebetween. In contrast, it may be understood that when an element is referred to as being "directly coupled" or "directly connected" to another element, there are no intervening elements present. Other expressions that explain the relationship between elements, such as "between", "directly between", "adjacent to", or "directly adjacent to", may be construed in the same way.

The terminology used herein is for describing various exemplary embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in the exemplary embodiment, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present invention belongs. It will be further understood that terms, such as those defined in commonly used dictionaries, may be interpreted as having a meaning which is consistent with their meaning in the context of the relevant art and the present invention, and will not be interpreted in an idealized or overly formal sense unless so defined herein.

Hereinbelow, various exemplary embodiments of the present invention will be described in detail with reference to the accompanying drawings. Throughout the drawings, the same reference numerals will refer to the same or like parts.

Figure 1:
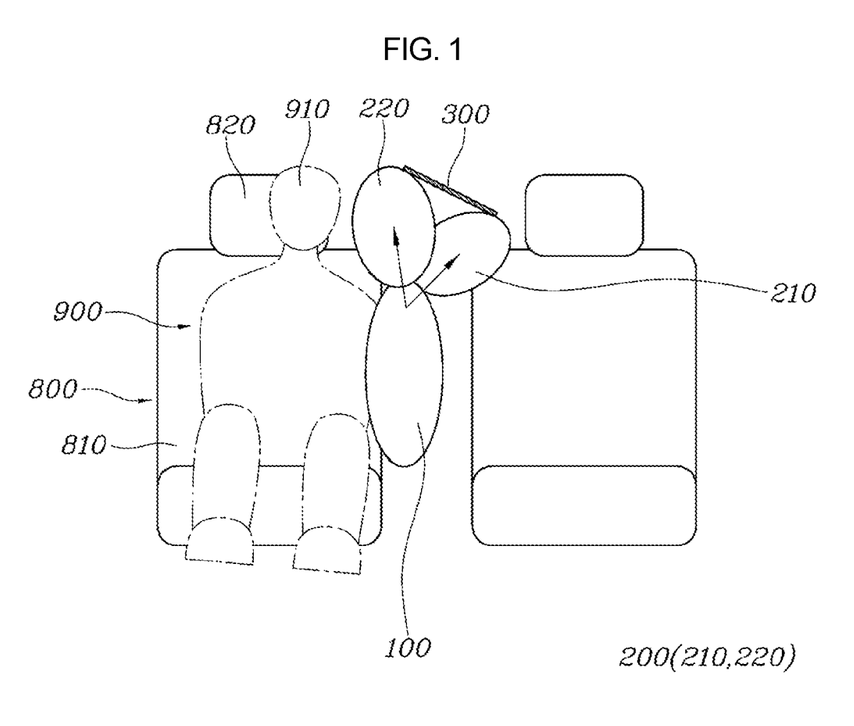
FIG. 1 is a front view exemplarily illustrating a vehicle center airbag according to various exemplary embodiments of the present invention.
Figure 2:
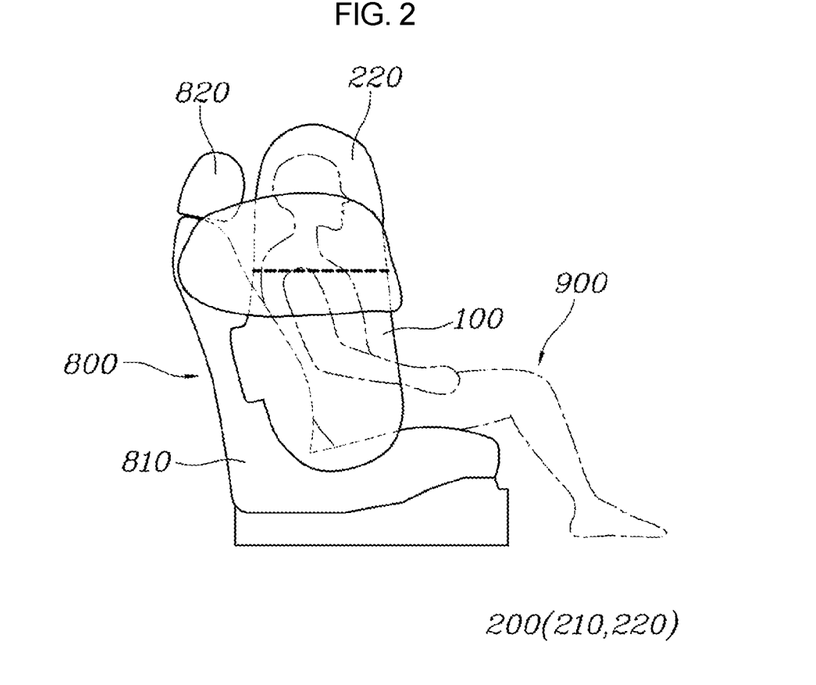
FIG. 2 is a side view exemplarily illustrating the vehicle center airbag according to the various exemplary embodiments of the present invention.
Figure 3:
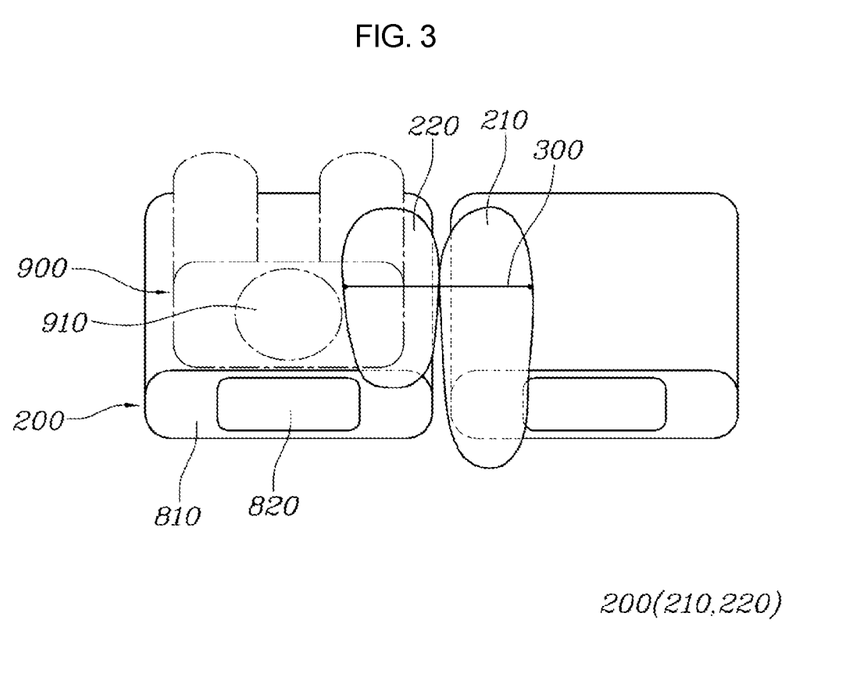
FIG. 3 is a top view exemplarily illustrating the vehicle center airbag according to the various exemplary embodiments of the present invention.
Figure 4:
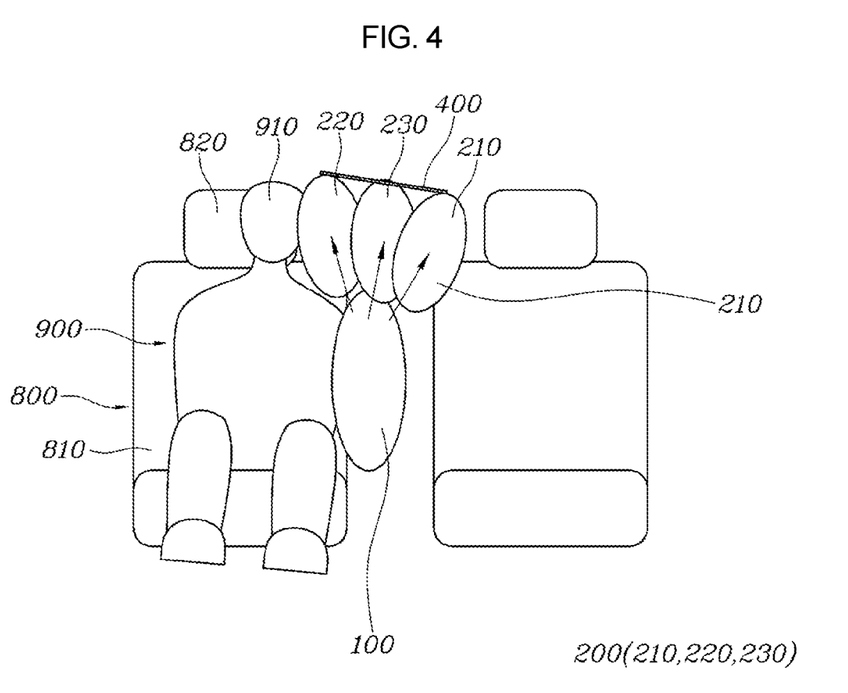
FIG. 4 is a front view exemplarily illustrating a vehicle center airbag according to various exemplary embodiments of the present invention.
Figure 5:
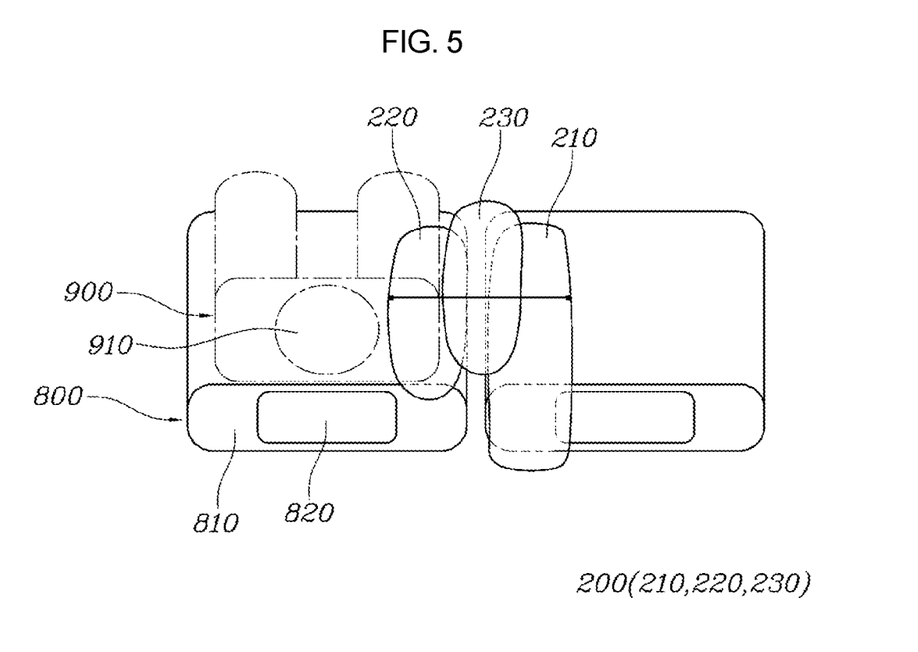
FIG. 5 is a top view exemplarily illustrating the vehicle center airbag according to the various exemplary embodiments of the present invention.
Figure 6:
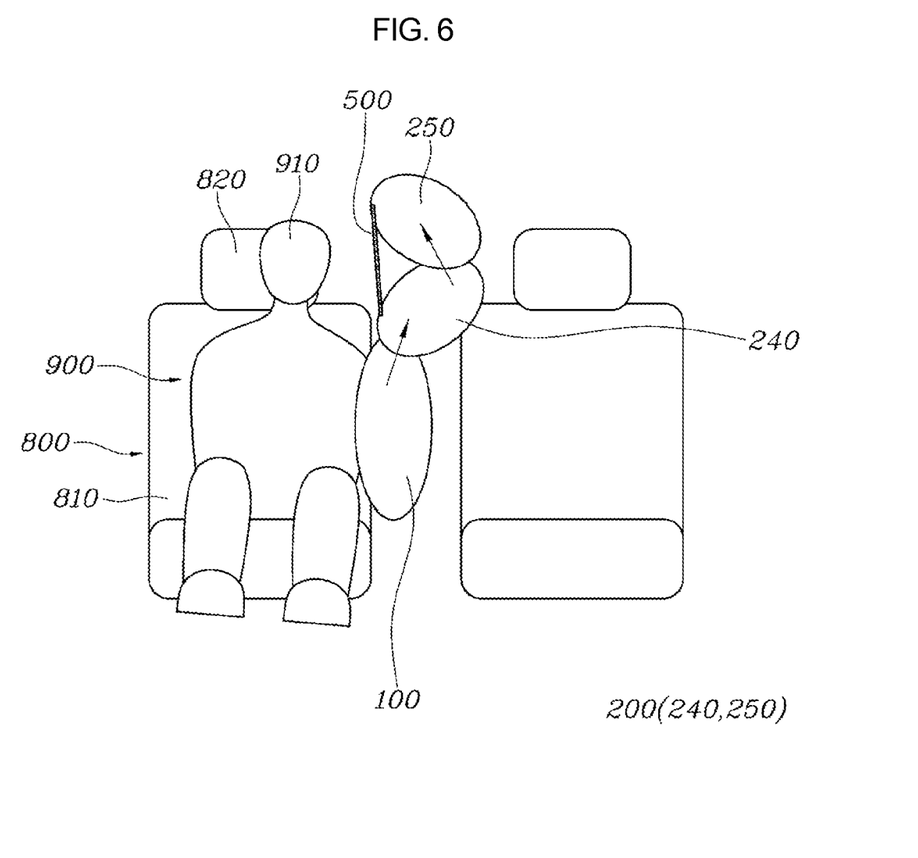
FIG. 6 is a front view exemplarily illustrating a vehicle center airbag according to various exemplary embodiments of the present invention.
Figure 7:
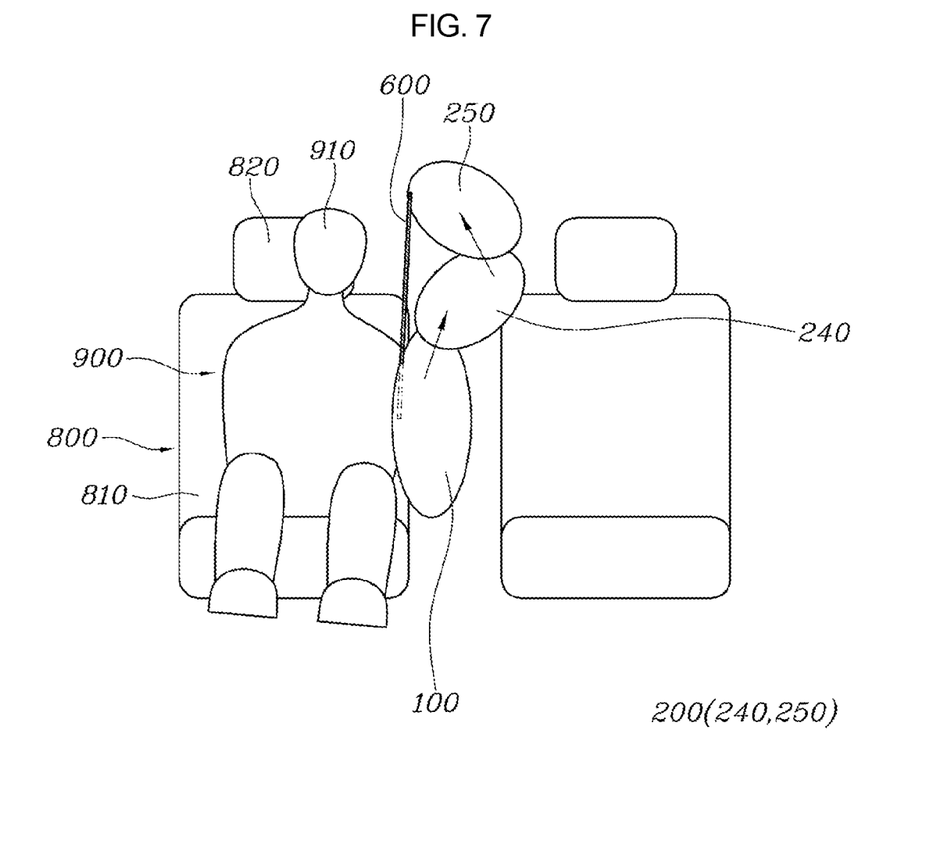
FIG. 7 is a front view exemplarily illustrating that a combination position of a second end-portion of a tether is changed in the vehicle center airbag according to the various exemplary embodiments of the present invention.
Figure 8:
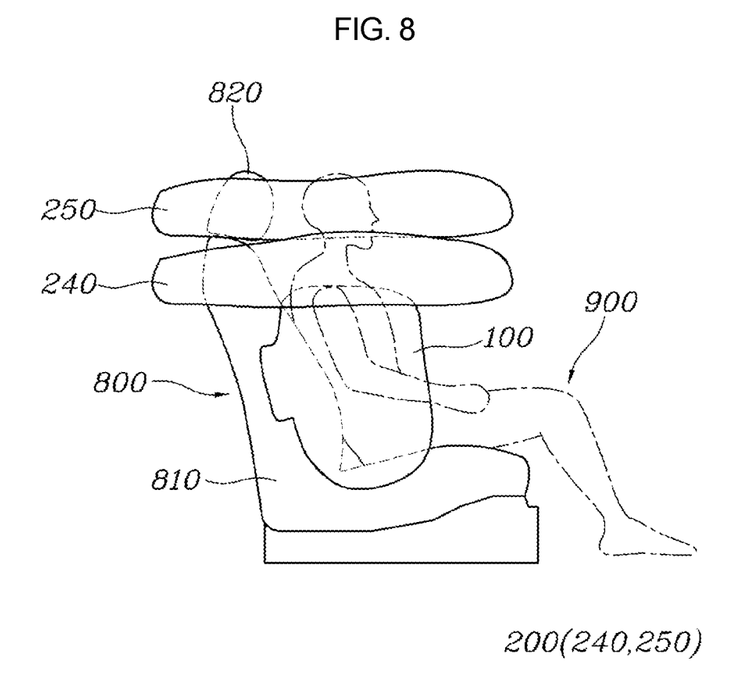
FIG. 8 is a side view exemplarily illustrating the vehicle center airbag according to the various exemplary embodiments of the present invention.
Figure 9:
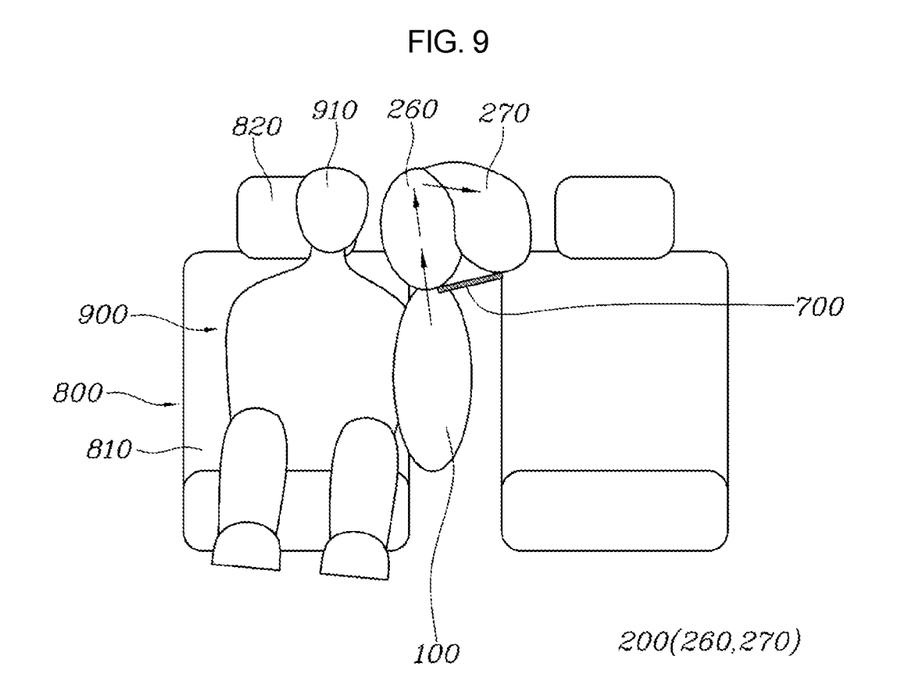
FIG. 9 is a front view exemplarily illustrating a vehicle center airbag according to various exemplary embodiments of the present invention.
Figure 10:
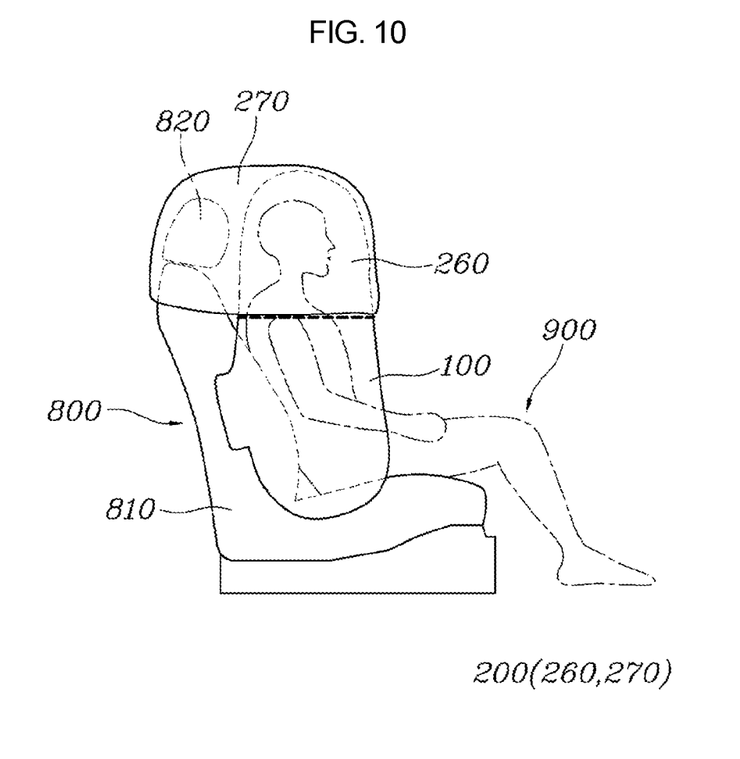
FIG. 10 is a side view exemplarily illustrating the vehicle center airbag according to the various exemplary embodiments of the present invention.

FIG. 1 is a front view exemplarily illustrating a vehicle center airbag according to various exemplary embodiments of the present invention. FIG. 2 is a side view exemplarily illustrating the vehicle center airbag according to the various exemplary embodiments of the present invention. FIG. 3 is a top view exemplarily illustrating the vehicle center airbag according to the various exemplary embodiments of the present invention. FIG. 4 is a front view exemplarily illustrating a vehicle center airbag according to various exemplary embodiments of the present invention. FIG. 5 is a top view exemplarily illustrating the vehicle center airbag according to the various exemplary embodiments of the present invention. FIG. 6 is a front view exemplarily illustrating a vehicle center airbag according to various exemplary embodiments of the present invention. FIG. 7 is a front view exemplarily illustrating that a combination position of a second end-portion of a tether is changed in the vehicle center airbag according to the various exemplary embodiments of the present invention. FIG. 8 is a side view exemplarily illustrating the vehicle center airbag according to the various exemplary embodiments of the present invention. FIG. 9 is a front view exemplarily illustrating a vehicle center airbag according to various exemplary embodiments of the present invention. FIG. 10 is a side view exemplarily illustrating the vehicle center airbag according to the various exemplary embodiments of the present invention.

The exemplary embodiments of the present invention will be described below with reference to FIGS. 1 to 10.

Of a door-side lateral surface and a center-side lateral surface of a seat back 810, the vehicle center airbag according to various exemplary embodiments of the present invention is mounted on the center-side lateral surface of the seat back 810, which faces toward a center armrest. When a vehicle side collision occurs, the vehicle center airbag is deployed. The vehicle center airbag includes a main cushion 100 positioned near the flank of a passenger 900 and a plurality of sub-cushions 200 positioned on top of the main cushion 100. The vehicle center airbag may further include a tether supporting the plurality of sub-cushions 200.

The vehicle center airbag according to various exemplary embodiments of the present invention is mounted to provide protection against a far side collision that occurs in a direction opposite to a passenger seat 800 in which a passenger 900 sits.

In the instant case, a plurality of embodiments of the present invention differ in terms of the shapes of the sub-cushions 200 and the shape of the tether that supports the sub-cushions 200.

The vehicle center airbag according to various exemplary embodiments of the present invention includes the main cushion 100 and the sub-cushions 200. The main cushion 100 is mounted on the center-side lateral surface of the seat back 810 of the seat 800. When a vehicle side collision occurs, the main cushion 100 is deployed in a forward direction, being positioned beside the passenger 900. The sub-cushions 200 are configured to communicate with the main cushion 100. At the time of the vehicle side collision, the sub-cushions 200 are deployed upwards from the top portion of the main cushion 100, extending in a backward-forward direction of a vehicle and being positioned besides the head of the passenger 900.

The vehicle seat 800 includes a seat cushion on which the passenger 900 sits, a seat back 810 on which the passenger 900 leans back, and a headrest 820 on which the passenger 900 rests his or her head 910.

The main cushion 100 and the sub-cushions 200 are mounted on the center-side lateral surface of the seat back 810 and deployed between the seats adjacent to each other when a side collision occurs. Herein after, the term "center-side lateral surface" refers to a lateral surface of a seat back, which is near a center armrest than a door. When a vehicle side collision occurs, the main cushion 100 is deployed toward the front of the vehicle and is thus positioned beside the passenger 900, preventing the passenger 900 from colliding with an internal component mounted inside the vehicle or with another passenger 900 sitting in an adjacent seat in the same row because the passenger 900 moves, due to the inertia, in a direction opposite to the collision spot.

Furthermore, the sub-cushions 200 are positioned on top of the main cushion 100 and provide protection of the head 910 and the shoulder of the passenger 900. The sub-cushions 200 are deployed at the same time as the main cushion 100 because the sub-cushions 200 are configured to communicate with the main cushion 100. Furthermore, since there is a plurality of sub-cushions 200, the head 910, neck, and shoulder of the passenger 900 may be more safely protected.

The main cushion 100 is deployed between the lateral surface of the seat 800 and the center console.

The main cushion 100 is mounted on the center-side lateral surface of the seat back 810, which faces toward the center armrest. When a side collision occurs, the main cushion 100 is deployed between the passenger 900 and the center console which is an internal component mounted inside the vehicle. The passenger 900 may be protected from injury caused by his or her collision with the center console. Furthermore, protection against a collision with another passenger 900 sitting in an adjacent seat as well as against a collision with the center console may be provided.

Next, a configuration of the vehicle center airbag according to the various exemplary embodiments of the present invention will be described.

The sub-cushions 200 include a first sub-cushion 210 which is to be deployed in a direction opposite to the passenger 900 from the top portion of the main cushion 100, and a second sub-cushion 220 which is to be deployed toward the passenger 900 from the top portion of the main cushion 100. When deployed, the first sub-cushion 210 extends in the backward-forward direction of the vehicle. Thus, a front portion of the first sub-cushion 210 supports a lateral surface of the second sub-cushion 220, and a rear portion thereof is supported on the lateral surface of an adjacent seat. When deployed, the second sub-cushion 220 is positioned beside the head 910 and the shoulder of the passenger 900.

Referring to FIG. 1 and FIG. 2, the first sub-cushion 210 is deployed in the opposite direction to the passenger 900 from the top portion of the main cushion 100, and the second sub-cushion 220 is deployed toward the passenger 900 from the top portion of the main cushion 100. Accordingly, when a vehicle side collision occurs, the head 910 and shoulder of the passenger 900 are brought into contact with the second sub-cushion 220 and thus may be protected.

The first sub-cushion 210 is deployed toward an adjacent seat and extends in the backward-forward direction of the vehicle. The front portion of the first sub-cushion 210 is brought into contact with the second sub-cushion 220 and thus supports the second sub-cushion 220. The rear portion of the first sub-cushion 210 is supported on a lateral surface of the adjacent seat. The supporting of the rear portion of the first sub-cushion 210 on the lateral surface of the adjacent seat connects the rear portion of the first sub-cushion 210 to the top portion of the main cushion 100. Thus, the main cushion 100 may be prevented from being moved.

The vehicle center airbag may further include a first tether 300 that causes tight contact between the first sub-cushion 210 and the second sub-cushion 220. To the present end, a first end portion of the first tether 300 is coupled to the first sub-cushion 210, and a second end portion thereof is coupled to the second sub-cushion 220.

With reference again to FIG. 3, to prevent the first sub-cushion 210 and the second sub-cushion 220 from being separated from each other when deployed, the first end portion of the first tether 300 is coupled to the top portion of the first sub-cushion 210, and the second end portion thereof is coupled to the top portion of the second sub-cushion 220. This causes the first sub-cushion 210 and the second sub-cushion 220 to support each other in a tightly contact state, more safely protecting the upper lateral portions of the upper body of the passenger 900.

Next, a configuration of the vehicle center airbag according to the various exemplary embodiments of the present invention will be described.

The sub-cushions 200 may further include a third sub-cushion 230 which is to be deployed between the first sub-cushion 210 and the second sub-cushion 220 so that both sides of the third sub-cushion 230 support the first sub-cushion 210 and the second sub-cushion 220, respectively.

A difference of the various exemplary embodiments of FIG. 1 in terms of configuration is that the third sub-cushion 230 is deployed between the first sub-cushion 210 and the second sub-cushion 220.

With reference to FIG. 4, the third sub-cushion 230 deployed between the first sub-cushion 210 and the second sub-cushion 220 supports the first sub-cushion 210 that, when the vehicle side collision occurs, is positioned beside the head 910 and the shoulder of the passenger 900. Thus, the head 910 and the shoulder of the passenger 900 may be more safely protected.

The vehicle center airbag may further include a second tether 400 that provides tight contact among the first sub-cushion 210, the second sub-cushion 220, and the third sub-cushion 230. To the present end, a first end portion of the second tether 400 is coupled to the first sub-cushion 210, and a second end portion thereof is coupled to the second sub-cushion 220.

With reference again to FIG. 5, since the first end portion of the second tether 400 is coupled to the first sub-cushion 210 and the second end portion thereof is coupled to the second sub-cushion 220, the first sub-cushion 210, the second sub-cushion 220, and the third sub-cushion 230 are brought into tight pressure contact with one another when they are deployed. Thus, the upper lateral portion of the upper body of the passenger 900 may be more safely protected.

Next, a configuration of the vehicle center airbag according to the various exemplary embodiments of the present invention will be described.

The sub-cushions 200 include a fourth sub-cushion 240 which is to be deployed in the direction opposite to the passenger 900 from the top portion of the main cushion 100 and a fifth sub-cushion 250 which is to be deployed toward the passenger 900 from the top portion of the fourth sub-cushion 240. The fourth sub-cushion 240 extends in the backward-forward direction thereof. The bottom portion of a front portion of the fourth sub-cushion 240 is connected to the top portion of the main cushion 100, and a rear portion thereof is supported on the lateral surface of an adjacent seat in the same row. When deployed, the fourth sub-cushion 240 and the fifth sub-cushion 250 are positioned in a region corresponding to the lateral portion of the shoulder and the lateral portion of the head 910 of the passenger 900.

With reference to FIGS. 6 to 8, the fourth sub-cushion 240 is deployed in the direction opposite to the passenger 900 from the top portion of the main cushion 100, and the fifth sub-cushion 250 is deployed toward the passenger 900 from the top portion of the fourth sub-cushion 240. Thus, the fourth sub-cushion 240 and the fifth sub-cushion 250 extend more broadly over the lateral portion of the upper body of the passenger 900 than the second sub-cushion 220. The lateral portion of the head 910 and shoulder of the passenger 900 may be broadly protected.

The fourth sub-cushion 240 is configured to communicate with the main cushion 100 and the fifth sub-cushion 250 is configured to communicate with the fourth sub-cushion 240. Therefore, the main cushion 100, the fourth sub-cushion 240, and the fifth sub-cushion 250 are sequentially deployed. Thus, when the vehicle side collision occurs, the torso of the passenger 900 is first protected by the main cushion 100 and the head 910 of the passenger 900, which is moved later than the torso of the passenger 900, and is then protected by the fourth and fifth sub-cushions 240 and 250.

Furthermore, the fourth and fifth sub-cushions 240 and 250 extend in the backward-forward direction of the vehicle, and the rear portion of the fourth sub-cushion 240 is supported on the lateral surface of the seat 800. Thus, it is possible to prevent the main cushion 100 connected to a bottom portion of the fourth sub-cushion 240 from being moved from the seat.

The vehicle center airbag may further include a third tether 500 that provides tight contact between the fourth sub-cushion 240 and the fifth sub-cushion 250. To the present end, a first end portion of the third tether 500 is coupled to the fourth sub-cushion 240, and a second end portion thereof is coupled to the fifth sub-cushion 250.

With reference to FIG. 6, since the first end portion of the third tether 500 is coupled to the fourth sub-cushion 240 and the second end portion of the third tether 500 is coupled to the fifth sub-cushion 250, the fourth sub-cushion 240 and the fifth sub-cushion 250 are brought into tight contact with each other. This prevents the fifth sub-cushion 250 from moving away from the passenger 900. Thus, the head 910 of the passenger 90 may be protected.

The vehicle center airbag may further include a fourth tether 600 that supports the fourth sub-cushion 240, the fifth sub-cushion 250, and the main cushion 100 to be positioned beside the passenger 900. To the present end, a first end portion of the fourth tether 600 is coupled to the fifth sub-cushion 250, and a second end portion thereof is coupled to the seat back 810.

With reference to FIG. 7, the first end portion of the fourth tether 600 is coupled to the fifth sub-cushion 250, and the second end portion thereof is coupled to a mounting portion of the seat back 810, on which the main cushion 100 and the sub-cushions 200 are mounted. Thus, the fifth sub-cushion 250 is supported in such a manner as not to move away from the passenger 900. Accordingly, when deployed, the fourth sub-cushion 240 connected to the fifth sub-cushion 250 and the main cushion 100 connected to the fourth sub-cushion 240 are not moved by an impact and may be positioned beside the passenger 900. Thus, the passenger 900 may be protected.

Next, a configuration of the vehicle center airbag according to the various exemplary embodiments of the present invention will be described.

The sub-cushions 200 may include a sixth sub-cushion 260 which is to be deployed upwards from the top portion of the main cushion 100 and a seventh sub-cushion 270 which is configured to communicate with the sixth sub-cushion 260 and which is to be deployed from the sixth sub-cushion 260 in a direction opposite to the passenger 900. The sixth sub-cushion 260 is positioned in a region corresponding to the lateral portion of the shoulder and head 910 of the passenger 900. The seventh sub-cushion 270 extends in the backward-forward direction thereof. A front portion thereof supports the sixth sub-cushion 260 and a rear portion thereof is supported on the lateral surface of the adjacent seat in the same row.

With reference to FIG. 9, the sixth sub-cushion 260 is deployed toward the passenger 900 from the top portion of the main cushion 100, and the seventh sub-cushion 270 is deployed in a direction opposite to the passenger 900 from the sixth sub-cushion 260. Accordingly, the sixth sub-cushion 260 is positioned in a region corresponding to the lateral portion of the head 910 and the shoulder of the passenger 900. Thus, the head 910 and shoulder of the passenger 900 may be protected. Furthermore, the seventh sub-cushion 270 extends in the backward-forward direction thereof. A front portion thereof supports the sixth sub-cushion 260 supporting the head 910 and the shoulder of the passenger 900. A rear portion thereof is supported on the lateral surface of the adjacent seat in the same row so that the main cushion 100 and the sixth sub-cushion 260 do not move even with the impact of the vehicle side collision.

The sixth sub-cushion 260 and the seventh sub-cushion 270 communicate with each other and are sequentially deployed. Thus, the upper body of the passenger 900 is first protected by the sixth sub-cushion 260 which is inflated earlier and the head 910 that moves later than the upper body of the passenger 900 is then protected by the seventh sub-cushion 270 which is inflated later. A communication portion is positioned on an upper portion or a middle portion of a connection portion connecting the sixth sub-cushion 260 and the seventh sub-cushion 270. Thus, speeds at which the sixth sub-cushion 260 and the seventh sub-cushion 270 are sequentially deployed may be adjusted.

The vehicle center airbag may include a fifth tether 700 that provides tight contact between the sixth sub-cushion 260 and the seventh sub-cushion 270. To the present end, a first end portion of the fifth tether 700 is coupled to the sixth sub-cushion 260, and a second end portion thereof is coupled to the seventh sub-cushion 270.

Since the first end portion of the fifth tether 700 is coupled to a bottom portion of the sixth sub-cushion 260 and the second end portion thereof is coupled to a bottom portion of the seventh sub-cushion 270, the sixth sub-cushion 260 and the seventh sub-cushion 270 are brought into tight contact with each other. Thus, when deployed, the seventh sub-cushion 270 may be prevented from moving upwards.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle center airbag apparatus comprising:
   a main cushion mounted on an inner lateral surface of a seat back of a first seat and configured to be deployed in a forward direction of the first seat so as to be disposed beside a passenger sitting in the first seat when deployed; and
   a plurality of sub-cushions fluidically-communicating with the main cushion and configured to be deployed upwards from a top portion of the main cushion, the plurality of sub-cushions extending in a backward-forward direction of the first seat so as to be disposed above a torso of the passenger when deployed,
   wherein the plurality of sub-cushions includes:
   a first sub-cushion fluidically-communicating with the main cushion and configured to be deployed in a direction opposite to the passenger sitting in the first seat from the top portion of the main cushion; and
   a second sub-cushion fluidically-communicating with the first sub-cushion and configured to be deployed toward the passenger from a top portion of the first sub-cushion,
   wherein the first sub-cushion extends in the backward and forward direction when deployed,
   wherein a bottom portion of a front portion of the first sub-cushion is connected to the top portion of the main cushion, and
   wherein a rear portion of the first sub-cushion is supported on a lateral surface of a second seat adjacent to the first seat in a same row.

2. The vehicle center airbag apparatus according to claim 1,
wherein the first sub-cushion and the second sub-cushion are respectively disposed at regions corresponding to a lateral portion of a shoulder of the passenger and a lateral portion of a head of the passenger sitting in the first seat.

3. The vehicle center airbag apparatus according to claim 1, further including a first tether having a first end portion coupled to the first sub-cushion and a second end portion coupled to the second sub-cushion, the first tether providing contact between the first sub-cushion and the second sub-cushion.

4. The vehicle center airbag apparatus according to claim 1, further including a second tether having a first end portion coupled to the second sub-cushion and a second end portion coupled to the seat back, the second tether supporting the first sub-cushion, the second sub-cushion, and the main cushion to be disposed beside the passenger.

5. The vehicle center airbag apparatus according to claim 1, wherein the main cushion, the first sub-cushion and the second sub-cushion are connected in series and deployed in series.

6. A vehicle center airbag apparatus comprising:
a main cushion mounted on an inner lateral surface of a seat back of a first seat and configured to be deployed in a forward direction of the first seat so as to be disposed beside a passenger sitting in the first seat when deployed; and
a plurality of sub-cushions fluidically-communicating with the main cushion and configured to be deployed upwards from a top portion of the main cushion, the plurality of sub-cushions extending in a backward-forward direction of the first seat so as to be disposed above a torso of the passenger when deployed,
wherein the plurality of sub-cushions includes:
a first sub-cushion fluidically-communicating with the main cushion and configured to be deployed upwards from the top portion of the main cushion; and
a second sub-cushion fluidically-communicating with the first sub-cushion so as to be deployed in a direction opposite to the passenger sitting in the first seat from the first sub-cushion,
wherein the second sub-cushion extends in the backward-forward direction wherein a front portion of the second sub-cushion supports the first sub-cushion and a rear portion of the second sub-cushion is supported on a lateral surface of a second seat adjacent to the first seat in a same row.

7. The vehicle center airbag apparatus according to claim 6, wherein the first sub-cushion is disposed at a region corresponding to a lateral portion of a shoulder and a head of the passenger.

8. The vehicle center airbag apparatus according to claim 6, further including a first tether having a first end portion coupled to the first sub-cushion and a second end portion coupled to the second sub-cushion, the first tether providing contact between the first sub-cushion and the second sub-cushion.

9. The vehicle center airbag apparatus according to claim 8, wherein a first end portion of the second sub-cushion is coupled to an upper portion of the first sub-cushion, the first end portion of the first tether is coupled to a lower portion of the first sub-cushion, and a second end portion of the first tether is coupled to a lower portion of the second sub-cushion.

* * * * *